United States Patent
Doddapaneni et al.

(10) Patent No.: US 6,291,100 B1
(45) Date of Patent: Sep. 18, 2001

(54) ELECTRODE COMPOSITION COMPRISING DOPED TUNGSTEN OXIDES AND ELECTROCHEMICAL CELL COMPRISING SAME

(75) Inventors: Narayan Doddapaneni; Zhendong Hu; Shigenobu Denzumi, all of Ann Arbor, MI (US)

(73) Assignee: IRMA America, Inc., Ann Arbor, MI (US)

( * ) Notice: Subject to any disclaimer, the term of this patent is extended or adjusted under 35 U.S.C. 154(b) by 0 days.

(21) Appl. No.: 09/396,464

(22) Filed: Sep. 15, 1999

(51) Int. Cl.$^7$ ................................................ H01M 4/48
(52) U.S. Cl. ................... 429/218.1; 429/217; 429/231.1; 429/332
(58) Field of Search ................ 429/217, 218.1, 429/231.1, 332

(56) References Cited

U.S. PATENT DOCUMENTS

| | | |
|---|---|---|
| 3,915,740 | 10/1975 | Elsenberg . |
| 4,476,204 | 10/1984 | Auborn . |
| 5,187,033 | 2/1993 | Koshiba . |
| 5,558,961 | 9/1996 | Doeff et al. . |
| 5,567,401 | 10/1996 | Doddapaneni et al. . |
| 5,783,333 | 7/1998 | Mayer . |

FOREIGN PATENT DOCUMENTS

| | | |
|---|---|---|
| 6-215770 | 8/1994 | (JP) . |
| 11-111294 | 4/1999 | (JP) . |
| 2000277111 | 10/2000 | (JP) . |

OTHER PUBLICATIONS

Auborn et al, "Lithium Intercalation Cells Without Metallic Lithium," *J. Electrochem. Soc.: Electrochemical Science and Technology,* Mar. 1987, pp. 638–641.

Search Report issued in International Application No. PCT/US00/25091, Nov. 2000.

Primary Examiner—John S. Maples
(74) Attorney, Agent, or Firm—Burns, Doane, Swecker & Mathis, LLP

(57) ABSTRACT

Provided is a novel electrode composition suitable for use in an electrochemical cell. The composition includes a polymeric binder material and a doped tungsten (IV) oxide active material. The active material includes a tungsten (IV) oxide host material and a metal dopant in the host material effective to increase the charge-discharge capacity per unit weight of the active material when used in an electrochemical cell. Also provided is a method for forming the electrode composition and an electrochemical cell comprising the composition. The invention results in an electrochemical cell having improved charge-discharge capacity per unit weight of the electrode active material, and is additionally chemically and electrochemically stable.

21 Claims, 5 Drawing Sheets

ELECTRODE COMPOSITION COMPRISING DOPED TUNGSTEN OXIDES AND ELECTROCHEMICAL CELL COMPRISING SAME

BACKGROUND OF THE INVENTION

1. Field of the Invention

The invention relates to an electrode composition having a doped tungsten (IV) active material, which electrode is suitable for use in an electrochemical cell. The invention also relates to an electrochemical cell which employs the electrode composition, as well as to a method of preparing the electrode composition. The invention has particular applicability to the manufacture of primary and rechargeable power sources.

2. Description of the Related Art

Metal oxides have been extensively used as electrode active materials in electrochemical systems, for example in batteries and capacitors. A lithium ion cell can be formed using metal oxides for both anode and cathode. Such a cell is desirable if a sufficiently high voltage and high capacity can be achieved.

Recently, lithium ion technology with metal oxide cathodes has been shown to outperform most of the existing rechargeable batteries. Such metal oxides are special materials in that they can act as host materials in accepting guest atoms and ions into their crystal lattice. Commonly used cathode metal oxides include, for example, lithiated cobalt oxides ($LiCoO_2$), lithiated nickel oxides ($LiNiO_2$) and lithiated manganese oxides ($LiMn_2O_4$). Typical metal oxides used in the anode include, for example, iron oxide ($Fe_2O_3$), tin oxide ($SnO_2$) and tungsten oxide ($WO_2$). Because of the instability of these oxides and their solubility in electrolyte solutions, lithium ion cells employing these oxides in the electrode active material crystal structure lose charge-discharge capacity during long term storage and/or after cycling.

Most of the commercially available lithium ion cells employ carbon as the anode active material. While carbon is capable of accepting lithium atoms into its crystal lattice and of performing well at ambient temperatures, the anode performance degrades at higher temperatures (e.g., greater than 45° C.) due to exfoliation caused by mechanical stress after repeated lithium intercalation. In addition, at high charge rates during intercalation, lithium metal tends to deposit on the surface of the carbon electrode. Such metal deposition on the carbon surface creates safety concerns due to dendrite formation as well as causing premature cell failure. Moreover, lithium ion cells can catch fire when operated under abuse conditions. In such cases, carbon can enhance the magnitude of the fire, thereby raising major safety concerns.

The use of tungsten (IV) oxide ($WO_2$) as an mode material is known. See, e.g., Aubom et al, "Lithium Intercalation of Cells Without Metallic Lithium," J. Electrochem. Soc.: Electrochemical Science and Technology, March 1987, pp. 638–641. The present inventors have also explored the use of tungsten (IV) oxide as an electrode material and found that it can provide significant benefits over other electrode materials such as carbon. For example, unlike carbon, tungsten oxide is not flammable and no dendrites are formed even at very high charge rates of, for example, greater than 20 $mA/cm^2$. These features are particularly important for high rate applications, for example, in electric vehicle anal power tool applications.

The electrochemical performance of a $Li/WO_2$ cell is shown in FIG. 1. As can be seen from that graph, the capacity of the cell increases with a decrease in cell voltage, as more lithium is being intercalated into the tungsten oxide host crystal structure. As the lithium intercalation proceeds, the crystal stricture of the resultant tungsten oxide changes and becomes electrochemically inactive. For example, when this cell was charged after discharging to 0.2V vs. Li, only a small fraction of the capacity was obtained. This is due to deterioration of the oxide crystal structure. It is, therefore, preferable to cycle the cell between 0.7 and 3.0V to obtain several hundred of charge-discharge processes.

To overcome or conspicuously ameliorate the disadvantages of the related art, it is an object of the present invention to provide an electrode composition which makes the electrode particularly suitable for use in an electrochemical cell. The electrode composition exhibits improved charge-discharge capacity per unit weight of the electrode active material, and is additionally chemically and electrochemically stable.

Other objects, advantages and aspects of the present invention will become apparent to one of ordinary skill in the art on a review of the specification, drawings and claims appended hereto.

SUMMARY OF THE INVENTION

According to a first aspect of the invention, a novel electrode composition suitable for use in an electrochemical cell is provided. The composition comprises a polymeric binder material and a doped tungsten (IV) oxide active material. The active material comprises a tungsten (IV) oxide host material and a metal dopant in the host material effective to increase the charge-discharge capacity per unit weight of the active material when used in an electrochemical cell.

According to a further aspect of the invention, a method of forming an electrode composition suitable for use in an electrochemical cell is provided. The method comprises the steps of:
(a) forming an electrode paste or slurry from components comprising a first solvent, a polymeric binder material and a doped tungsten (IV) oxide active material, wherein the active material is formed by a process comprising the steps of:
  (i) mixing a tungsten (VI) oxide or a tungsten salt with a salt of the metal dopart and a second solvent, thereby forming a mixture;
  (ii) heating the mixture to substantially remove the solvent therefrom;
  (iii) performing a further heat treatment of the mixture; and
  (iv) cooling the resulting product to ambient temperature;
(b) forming a coating of the electrode slurry; and
(c) evaporating the solvent.

According to yet a further aspect of the invention, an electrochemical cell is provided. The cell comprises an anode, a cathode and an electrolyte providing a conducting medium between said anode and the cathode. The anode or the cathode comprises an electrode composition comprising a polymeric binder material and a doped tungsten (IV) oxide active material. The active material comprises a tungsten (IV) oxide host material and a metal dopant in the host material effective to increase the charge-discharge capacity per unit weight of the active material.

BRIEF DESCRIPTION OF THE DRAWINGS

The objects and advantages of the invention will become apparent from the following detailed description of the preferred embodiments thereof in connection with the accompanying drawings, in which like numerals designate like elements, and in which.

DETAILED DESCRIPTION OF THE PREFERRED EMBODIMENTS OF THE INVENTION

Figure 1:
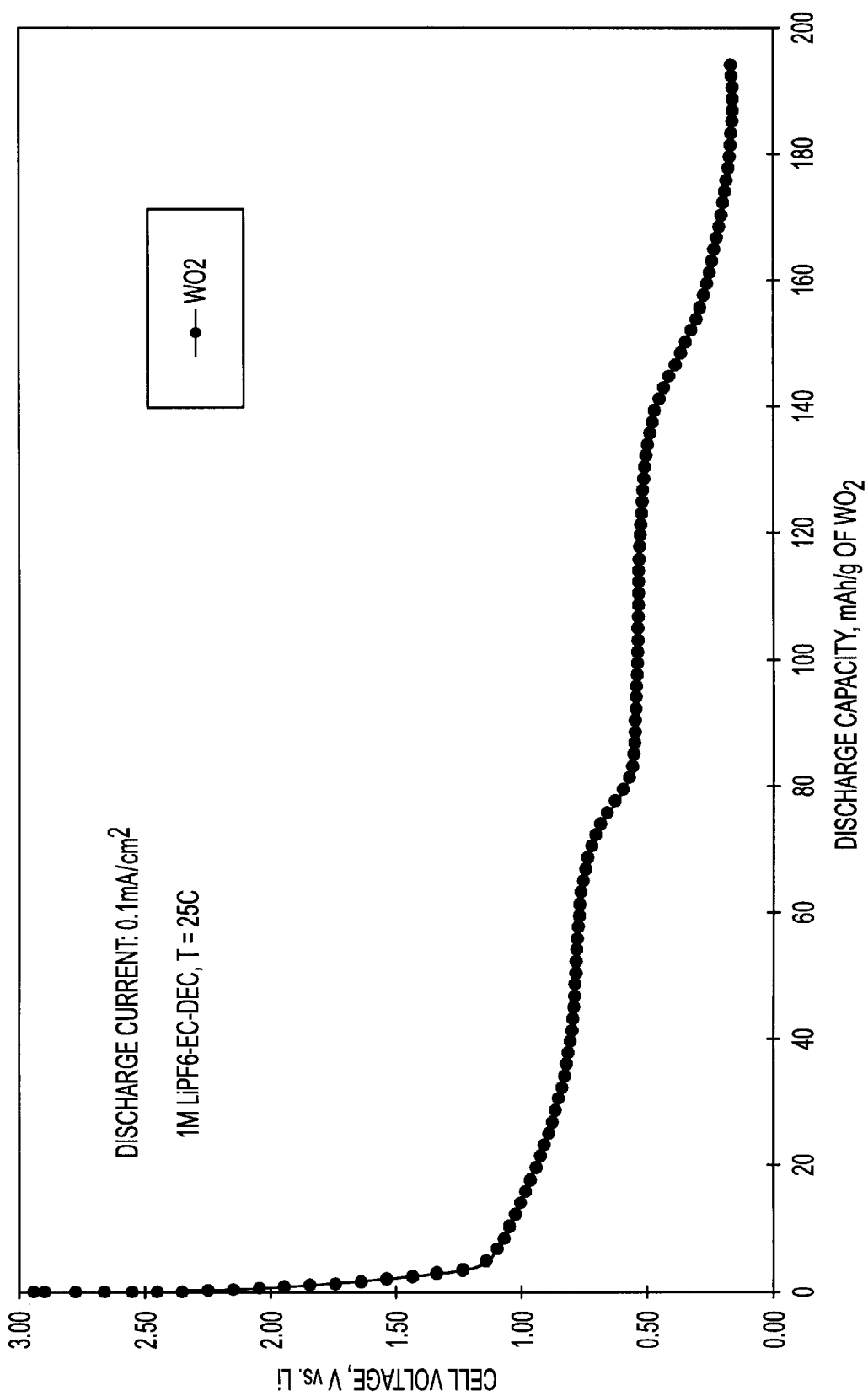
FIG. 1 is a graph of cell voltage versus discharge capacity, showing the discharge voltage profile, for a Li/WO$_2$ cell.

The electrode composition in accordance with the invention includes a tungsten (IV) oxide electrode active host material and a metal dopant in the host material. The metal dopant is effective to increase the charge-discharge capacity per unit weight of the electrode active materials, as well as providing improved chemical and electrochemical stability and high temperature performance when compared with cells employing an undoped tungsten oxide or other conventional electrode materials.

As used herein, the term "metal dopant" means a metal atom or ion which has been incorporated into the host material crystal lattice during formation of the material. This does not include atoms or ions introduced into the crystal lattice of the host material during use of the electrode occurring, for example, during intercalation.

The doped tungsten (IV) oxide includes a minor amount of the metal dopant, for example, from about 1 to 50 mol %, preferably from about 5 to 15 mol %. The doped tungsten oxide is preferably of general formula $A_xW_{1-x}O_2$, wherein A is a metal, and x is a number from 0.01 to 0.5, preferably from 0.05 to 0.15. One or more additional dopant metals can optionally be employed.

Preferable metals for use as the dopant include, but are not limited to, aluminum (Al), manganese (Mn), barium (Ba), cobalt (Co), molybdenum (Mo), tin (Sn), titanium (Ti), yttrium (Y), zirconium (Zr) or combinations thereof. Of these dopants, aluminum and manganese are preferred as these materials are both non-toxic and relatively inexpensive.

Methods for forming the doped tungsten oxide electrodes in accordance with the invention will now be described. The process allows for the preparation of such electrodes having the desired charge-discharge capacity per unit weight of the electrode active material and chemical and electrochemical stability characteristics. In addition, the process allows for control of the physical characteristics of the resultant material. For example, the materials may be fabricated to comprise materials of variable particle sizes, including submicron sized particles having high surface area. This eliminates additional material processing steps, such as grinding, sieving, etc., which are typically needed to fabricate electrodes, particularly in all solid state systems.

First, a salt of tungsten or tungsten (VI) oxide (WO$_3$) is mixed with a salt of the desired dopant and a solvent in a suitable container. The order of mixing is not critical. However, it is preferred that the dopant metal salt first be added to and mixed with the solvent, followed by adding and micing in of the tungsten (VI) oxide (WO$_3$) or salt. An exemplary tungsten salt is ammonium tungsten oxide [(NH$_4$)$_{10}$W$_{12}$O$_{41}$.xH$_2$O]. In the case of aluminum or manganese as the dopant material, a suitable salt includes, for example, aluminum nitrate [Al(NO$_3$)$_3$.9H$_2$O] or manganese nitrate [Mn(NO$_3$)$_2$.xH$_2$O], respectively. The mixing can be accomplished in various ways, including grinding the solid materials or by dissolution in water or other suitable solvent. A pore former such as ammonium nitrate, ammonium bicarbonate, ammonium carbonate, urea, or the like, can optionally be included in the mixture.

The solvent is removed by heating of the mixture at an appropriate temperature while stirring. The heating temperature will depend on the solvent and other components of the mixture. A temperature of from about 100 to 120° C. is typical where water is used as the solvent.

The resulting dried powder is next ground and heat treated, for example, in a tube furnace. This heat treatment completely dries the powder and activates the dopant in the tungsten oxide crystal lattice, thereby forming doped tungsten (IV) oxide, for example of the above-described general formula $A_xW_{1-x}O_2$. Preferably, this heat treatment is a stepwise heat treatment of the completely dried powder. After evacuating the tube furnace to preferably about 800 microtorr, hydrogen or a hydrogen-containing inert gas such as an argon-hydrogen gas mixture is flushed through the tube at a typical rate of from about 10 to 200 ml/min, while raising the temperature of the furnace from ambient temperature to a temperature of from about 650 to 800° C., preferably from about 675 to 700° C., in a time period of, for example, from about 60 minutes to 4 hours. The temperature ramp rate is preferably from about 0.3 to 10° C./min. The powder is next baked at that temperature with the gas flow continued for from about 30 to 200 hours. The temperature of the furnace is then ramped down with hydrogen atmosphere to ambient temperature. The product is then ready for immediate use to fabricate electrodes. Alternatively, the material can be stored in a dry, air tight container until required for further use.

The powder obtained has substantially the same structural formula as the tungsten (IV) oxide host material, as will become apparent upon review of the specific examples below. The rate of heating and cooling, and the amount of pore formers, if used, are the predominant controllers of the particle size and surface area of the resultant doped tungsten oxides.

The resulting powder can then be used to form, through conventional techniques, an electrode composition which can be used in an anode or cathode in an electrochemical cell. A method for preparing the electrode from the doped tungsten (IV) oxide powder will now be described. An electrode paste or slurry is formed by mixing together a binder, a solvent and the doped tungsten oxide powder. Optionally, a conductive carbon material can be added. Typical binders include, for example, polyvinylidene fluoride (PVDF) and TEFLON powder. The solvent can be, for example, 1-methyl-2-pyrrolidinone, dimethyl sulfoxide, acetonitrile, and dimethyl formate. The conductive carbon material can be, for example, acetylene black conductive carbon, graphite or other known materials. Typically, the binder is first added to and mixed with the solvent. This is followed by addition of the conductive carbon material and mixing. Next, the tungsten oxide is added and mixed to form a thick paste to slurry. The paste or slurry is coated on a smooth, flat surface, and a desired thickness (e.g., from about 0.001 to 0.01 inch) is obtained by use of a suitable tool such as a doctor blade. The material is; then dried, preferably under vacuum, at from about 130 to 170° C., preferably about 150° C., for a period of from about 6 to 15 hours.

Figure 5:
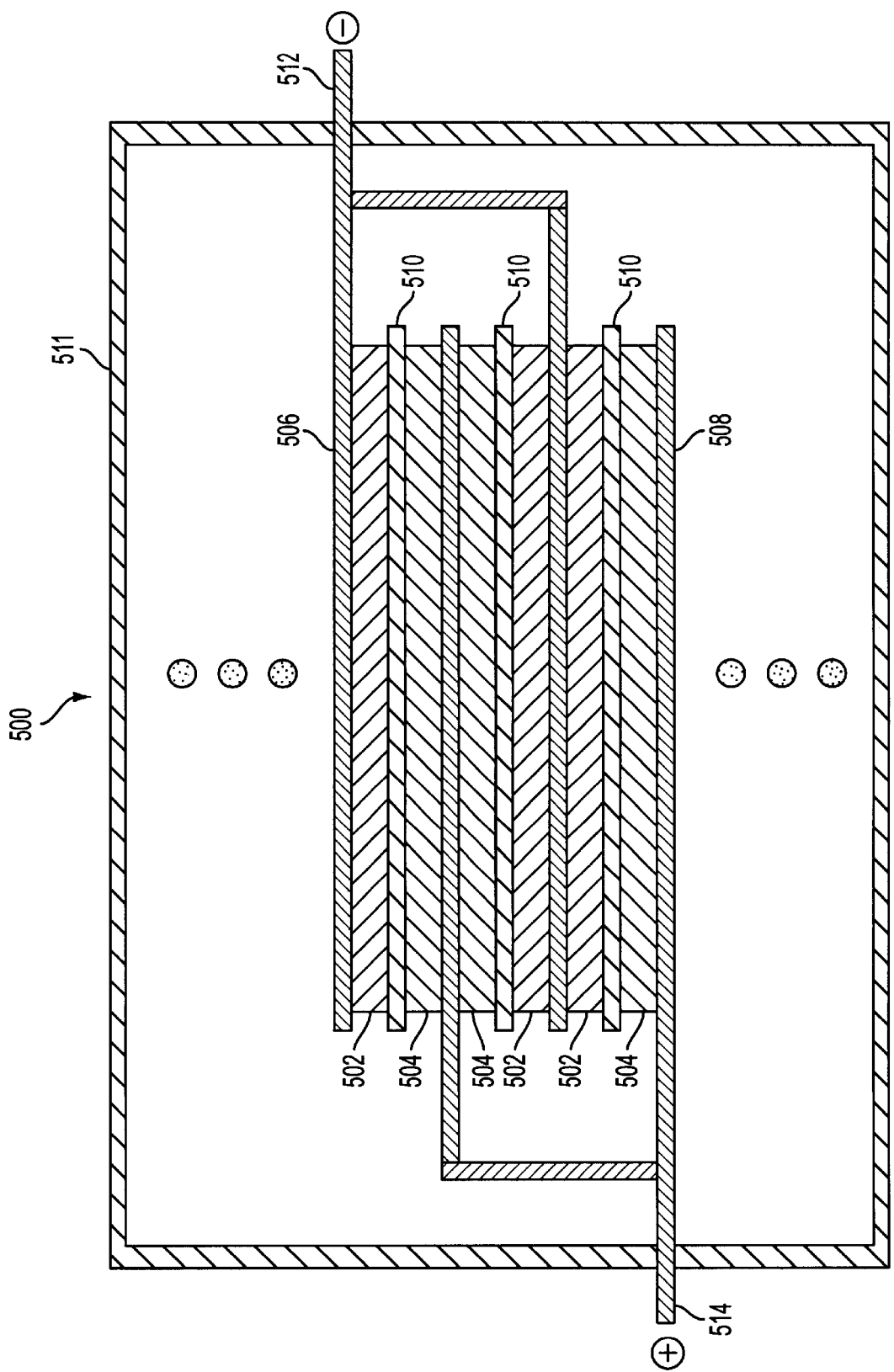
FIG. 5 is a schematic diagram of an exemplary electrochemical cell in accordance with one aspect of the invention.

The electrode in accordance with the invention can be employed in an electrochemical cell as an anode or a cathode. With reference to FIG. 5, an exemplary electrochemical cell 500 in accordance with the invention will now be described. A series of anodes 502 and an equal number of cathodes 504 typically of the same thickness are formed on anode and cathode current collectors 506, 508. Either the anode or cathode is constructed from the doped tungsten oxide material described above. The other of the anode or cathode is formed of a suitable electrode material, for example, metallic lithium anode or other conventional material. Suitable materials for the current collectors are known and include, for example, aluminum, copper or nickel, for the anode current collector, and aluminum for the cathode current collector.

The anodes or cathodes are typically formed on opposite surfaces of the anode current collectors 506 or cathode current collectors 508, respectively. As shown, a separator 510 is formed for each of the anode-cathode pairs to prevent contact between the anodes 502 and cathodes 504 in the final structure. Suitable separator materials are known in the art and include, for example, Celgard® 3501, commercially available from Hoechst Celanese.

The anodes 502 and cathodes 504 are alternately stacked in an array as shown. The electrochemical cell 500 is placed into a container 511, such as a plastic bag, and the anode and cathode current collectors 506, 508 are each connected to a respective terminal or electrical feedthrough 512, 514 in the container. Electrolyte is then added to the cell, and the cell is sealed. Optionally, the electrolyte can be filled after pulling a vacuum on the interior of container 511. Suitable electrolytes are known in the art and include, for example, $LiPF_6$ in ethylene carbonate (EC) and diethylcarbonate (DEC) or in ethylene carbonate (EC) and dimethylcarbonate (DMC). Other known, non-aqueous electrolytes that are suitable for lithium cells can alternatively be employed.

In order to further illustrate the present invention and the advantages thereof, the following specific examples are given, it being understood that same are intended only as illustrative and in nowise limitative. The following examples demonstrate the significantly improved results which can be achieved through use of the doped tungsten oxide material as an active electrode material.

Comparative Example 1
Preparation of $WO_2$ Powder

Undoped tungsten (IV) oxide ($WO_2$), purchased from Cerac Inc., Milwaukee, Wis., USA was used as received for purposes of comparison.

Figure 2:
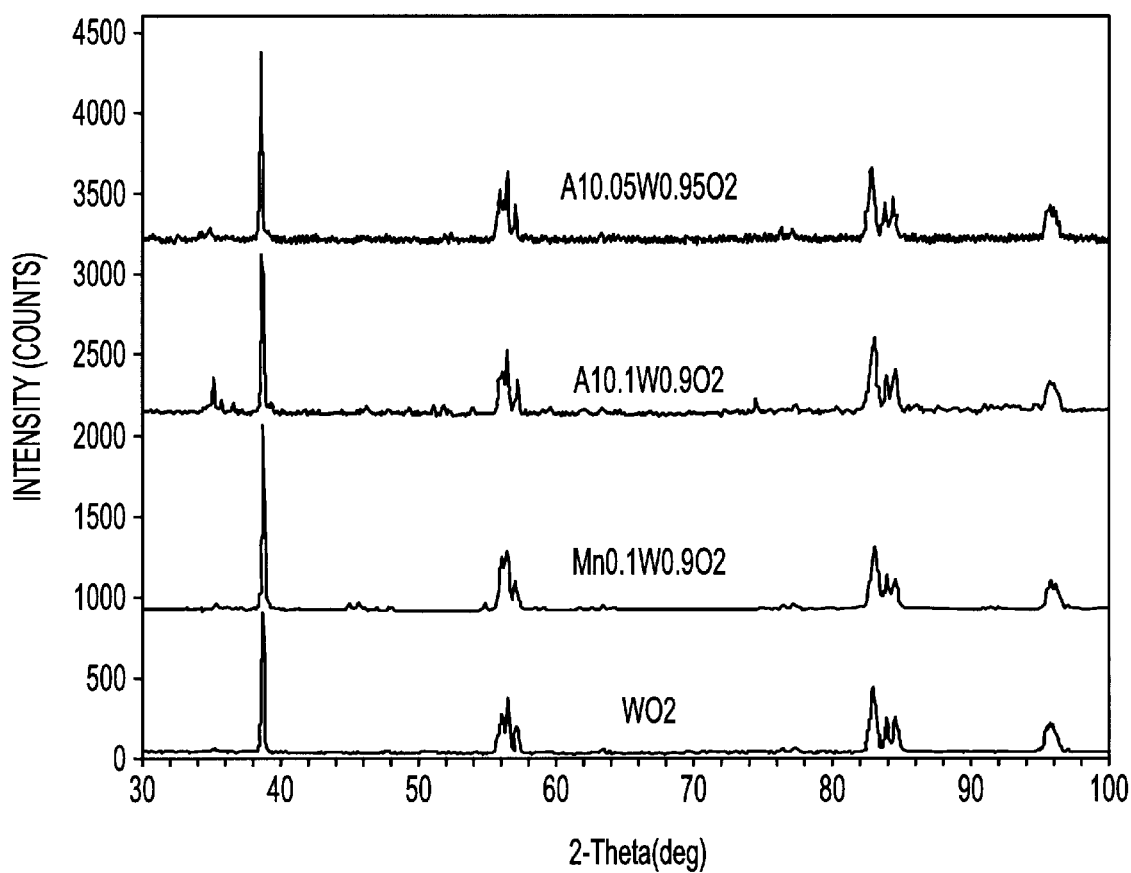
FIG. 2 shows X-ray diffraction patterns for electrode compositions prepared in accordance with the invention and for a comparative WO$_2$ electrode composition.

The dried tungsten oxide powder was visually examined, and was found to have a dark grayish brown color. The X-ray diffraction pattern was measured with a Rigaku MiniFlex X-ray Diffractometer with a chromium cathode. The scan rate was 2 degrees per minute with silicon powder being used as a reference. The resulting diffraction pattern is shown in FIG. 2, and is further described in numerical form in Table 1.

EXAMPLE 1

Preparation of $Al_{0.05}W_{0.95}O_2$ Powder 1.52 g of aluminum nitrate ($Al(NO_3)_3 \cdot 9H_2O$) was dissolved in 30 ml of water in a 100 ml glass beaker. 20 g of ammonium tungsten oxide [$(NH_4)_{10}W_{12}O_{41} \cdot xH_2O$, 89.2% $WO_3$ yield] powder was then added to the beaker and mixed thoroughly. After removing the solvent at 110° C. while stirring, the powder was ground and then placed in a tube furnace. After evacuating the tube furnace for 15 minutes, argon gas containing 5% hydrogen (Ar (5%$H_2$)) was flushed therethrough at a rate of 12 ml/min while raising the temperature of the furnace to 650° C. in one hour. The mixture was baked at 650° C. with the Ar (5%$H_2$) flow for 132 hours, and then cooled with the Ar (5%$H_2$) flow. Visual examination showed the powder as having a dark grayish brown color. The X-ray diffraction pattern was measured as in Comparative Example 1. The resulting spectrum is shown in FIG. 2 and is described in numerical form in Table 1.

EXAMPLE 2

Preparation of $Al_{0.1}W_{0.9}O_2$ Powder 0.947 g of aluminum nitrate ($Al(NO_3)_3 \cdot 9H_2O$) w as dissolved in 5 ml of water in a 100 ml glass beaker. 5.844 g of ammonium tungsten oxide [$(NH_4)_{10}W_{12}O_{41} \cdot xH_2O$, 89.2% $WO_3$ yield] powder was then added to the beaker and mixed thoroughly. After removing the solvent at 100° C. while stirring, the powder was ground and then placed in a tube furnace. After evacuating the tube furnace for 15 minutes, Ar (5%$H_2$) was flushed therethrough at a rate of 12 ml/min while raising the temperature of the furnace to 650° C. in one hour. The mixture was baked at 650° C. with the Ar (5%$H_2$) flow for 179 hours, and then cooled with the Ar (5%$H_2$) flow. Visual examination showed the powder as having a dark grayish color. The X-ray diffraction pattern was measured as in Comparative Example 1. The resulting spectrum is shown in FIG. 2 and is described in numerical form in Table 1.

EXAMPLE 3

Preparation of $Mn_{0.1}W_{0.9}O_2$ Powder 1.23 g of manganese nitrate [$Mn(NO_3)_2 \cdot xH_2O$, 22.0% Mn yield] and 12.1 g of ammonium tungstate hydrate [$(NH_4)_6 H_2W_{12}O_{41} \cdot xH_2O$, 85% $WO_3$ yield] were dissolved in 10 ml of water in a 100 ml glass beaker. After removing the solvent at 110° C. while stirring, the powder was ground and then placed in a tube furnace. After evacuating the tube furnace for 15 minutes, Ar (5%$H_2$) was flushed therethrough at a rate of 12 ml/min while raising the temperature of the furnace to 650° C. in one hour. The mixture was baked at 650° C. with the Ar (5%$H_2$) flow for 101 hours, and then cooled with the Ar (5%$H_2$) flow. Visual examination showed the powder as having a dark grayish brown color. The X-ray diffraction pattern was measured as in Comparative Example 1. The resulting spectrum is shown in FIG. 2 and is described in numerical form in Table 1.

TABLE I

X-ray Diffraction Data

| $WO_2$ | | $Al_{0.05}W_{0.95}O_2$ | | $Al_{0.1}W_{0.9}O_2$ | | $Mn_{0.1}W_{0.9}O_2$ | |
|---|---|---|---|---|---|---|---|
| d(A) | I | d(A) | I | d(A) | I | d(A) | I |
| | | 4.2977 | 2 | | | | |
| | | 4.0572 | 4 | | | | |
| | | 3.8712 | 5 | 3.7863 | 12 | 3.7845 | |
| | | 3.8110 | 8 | 3.7394 | 5 | | |
| | | | | 3.6466 | 4 | | |
| 3.4535 | 100 | 3.4514 | 100 | 3.4519 | 100 | 3.4511 | 100 |
| | | 2.9320 | 2 | 2.9232 | 4 | 2.9985 | 3 |
| | | | | 2.6613 | 4 | 2.9539 | 3 |
| | | | | 2.6233 | 3 | 2.4979 | 2 |
| | | | | 2.5289 | 4 | | |
| 2.4438 | 35 | 2.4430 | 28 | 2.4419 | 31 | 2.4451 | 26 |
| 2.4248 | 46 | 2.4268 | 39 | 2.4254 | 52 | 2.4292 | 33 |
| 2.3981 | 23 | 2.4009 | 29 | 2.3999 | 38 | 2.4046 | 19 |
| | | 2.1840 | 3 | 2.1835 | 3 | | |
| | | | | 1.8923 | 4 | | |
| | | 1.8552 | 3 | | | 1.8524 | 2 |
| 1.8323 | 6 | 1.8346 | 4 | 1.8326 | 5 | 1.8366 | 3 |
| 1.7296 | 65 | 1.7285 | 35 | 1.7287 | 35 | 1.7282 | 30 |
| 1.7139 | 25 | 1.7141 | 10 | 1.7133 | 14 | 1.7141 | 13 |
| 1.7029 | 30 | 1.7041 | 22 | 1.7028 | 33 | 1.7048 | 15 |
| 1.5465 | 28 | 1.5472 | 14 | 1.5447 | 16 | 1.5460 | 13 |
| 1.5425 | 21 | 1.5425 | 12 | 1.5418 | 14 | 1.5418 | 10 |

As can be seen from the resulting X-ray diffraction data, the characteristic peaks of the $WO_2$ electrode material are present at substantially identical positions in the $Al_{0.05}W_{0.95}O_2$, $Al_{0.1}W_{0.9}O_2$ and $Mn_{0.1}W_{0.9}O_2$ electrode materials. These spectra make clear that the crystal structure of the doped $WO_2$ electrode materials in accordance with the invention have substantially the same crystal structure as that of the undoped $WO_2$ electrode material, and that the dopants are well incorporated in the $WO_2$ crystal structure.

Comparative Example 2
Preparation of Electrode, Cell and Evaluation 3.5 g of polyvinylidene fluoride (PVDF-741, made by Elf Atochem of Philadelphia, Pa.) was dissolved in 50 g of 1-methyl-2-pyrrolidinone at 80° C. 4 g of Chevron acetelyne black conductive carbon was added and mixed well. Finally, 42.5 g of the tungsten oxide from Comparative Example 1 was added and mixed well to form a thick paste to slurry. Using a doctor blade, thin (0.001 to 0.010 inch) electrode sheets were fabricated. The electrodes were then dried under vacuum at 150° C. for 6–15 hours.

The electrochemical performance of the undoped tungsten oxide electrode material purchased from Cerac Inc. was evaluated by fabricating an electrochemical cell as illustrated in FIG. 5. A series of 0.010 inch thick metallic lithium anodes 502 and an equal number of cathodes 504 of the same capacity equivalent thickness, constructed from the undoped tungsten oxide material of Comparative Example 1, were used to construct the cell. Copper and aluminum foils were used as anode and cathode current collectors 506,508. Celgard® 3501, commercially available from Hoechst Celanese, was used to form a separator 510 between each of the anode/cathode pairs. Each of the separators was formed with two 0.001 inch thick layers of the material. Cells having an electrode area of 12.7 cm² were packaged in plastic bags and sealed after activation with 1.0 M $LiPF_6$ in ethylene carbonate (EC) and diethylcarbonate (DEC) solutions (1:1) as the elect-olyte. Other known, non-aqueous electrolytes that are suitable for lithium cells can also be employed.

Figure 3:
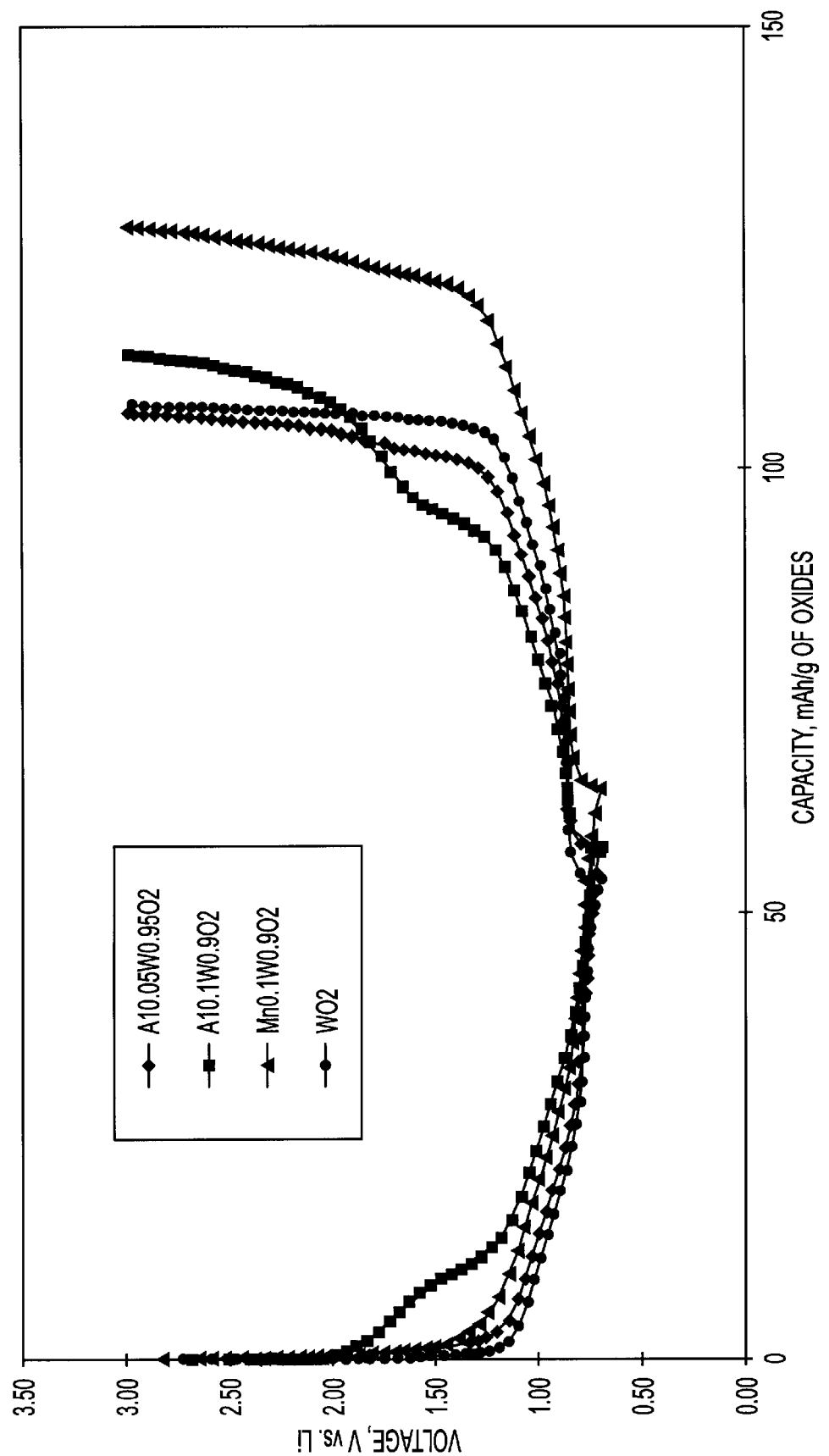
FIG. 3 is a graph of voltage versus capacity of doped and undoped tungsten (IV) oxides, showing voltage profiles during discharge and charging periods.

The cell was then discharged and charged, and various performance characteristics of the cell were measured. The discharge voltage characteristics of the cell were measured for a discharge current of 0.1 mA/cm². The results thereof are illustrated in FIG. 1 which is a graph of cell voltage versus discharge capacity. The voltage profile of the cell (FIG. 3) was, however, measured using a discharge and charge current of 10 mA. From a starting voltage of about 2.8V, the discharge was allowed to proceed until a minimum voltage of 0.7V was reached, at which time the cell was charged to 3V. The results are shown in FIG. 3, which is a graph of voltage versus capacity as measured in mAh/g of oxides. The capacity fade characteristics of the cell were also determined. The results are shown in FIG. 4, which is a graph of discharge capacity versus number of cycles for the cell.

EXAMPLES 4–6
Preparation of Electrodes, Cells and Evaluation

The electrochemical performance of the doped tungsten oxide electrode materials prepared in Examples 1–3 were evaluated by fabricating an electrochemical cell in the same manner described above with reference to Comparative Example 1. The voltage profile and capacity fade characteristics were measured in the same manner described above. The results of those tests are also shown in FIGS. 3 and 4, respectively. As can be seen from these figures, improved capacities can be achieved with cells built with doped tungsten (IV) oxides.

Figure 4:
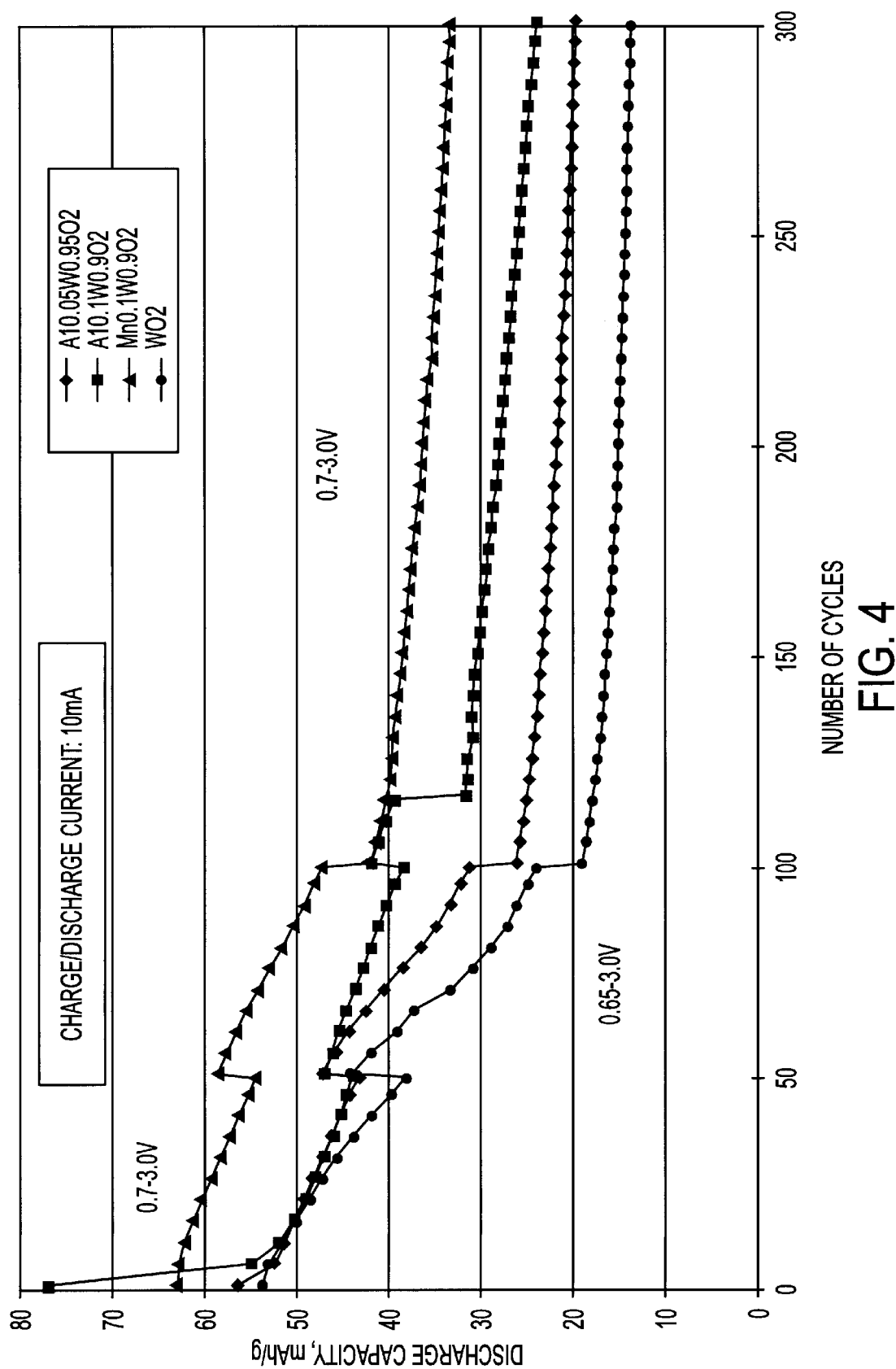
FIG. 4 is a graph of discharge capacity versus number of cycles for three electrochemical cells which include doped tungsten oxide electrode compositions in accordance with the invention, and a comparative cell using an undoped tungsten oxide composition.

In particular, FIG. 4 shows that significant capacity improvements with the doped tungsten oxides were achieved. When cells were cycled between 0.65 and 3.0 volts, the capacity fade of cells with undoped tungsten (IV) oxide was greater than the cells with doped tungsten (IV) oxides. Cell capacity fade was, in general, higher for the cell with the undoped tungsten oxide. It should be noted, however, that part of the capacity fade was due to the use of the lithium metal anode. In summary, the doping of tungsten oxide can dramatically improve not only the capacity, but also can increases its crystal structure stability during intercalation and deintercalation taking place during the cell charging and discharging processes.

A wide range of uses are envisioned for the electrodes and electrochemical cells in accordance with the present invention. For example, without being limited in anyway thereto, the invention is particularly applicable to the following applications.

The inventive electrodes and cells can be used, for example, as a battery in cellular or other forms of mobile telephones; in electrically powered vehicles such as a pure electric vehicle, a hybrid electric vehicle or a power assisted electric vehicle (e.g., automobiles, trucks, mopeds, motorcycles powered by an engine and a battery or by a fuel cell and a battery); in medical devices; in power tools; in animal tracking systems; and in security systems such a personal computer or building security systems; in security cards or credit cards which use an internal power supply. In general, the invention is applicable to any type of device where a capacitor or battery are used. Furthermore, the materials of the invention can be used as either a cathode or anode active material.

While the invention has been described in detail with reference to specific embodiments thereof, it will be apparent to one skilled in the art that various changes and modifications can be made, and equivalents employed, without departing from the scope of the appended claims.

What is claimed is:

1. An electrode composition suitable for use in an electrochemical cell, comprising a polymeric binder material and a doped tungsten (IV) oxide active material, the active material comprising a tungsten (IV) oxide host material and a metal dopant in the host material effective to increase the charge-discharge capacity per unit weight of the active material when used in an electrochemical cell.

2. The electrode composition according to claim 1, wherein the metal dopant is a metal selected from the group consisting of aluminum, manganese, barium, cobalt, molybdenum, tin, titanium, yttrium, zirconium and combinations thereof.

3. The electrode composition according to claim 2, wherein the metal dopant is aluminum or manganese.

4. The electrode composition according to claim 1, wherein the active material is of general formula $A_xW_{1-x}O_2$, wherein A is a metal, and x is a number from 0.05 to 0.15.

5. The electrode composition according to claim 1, wherein the active material has an X-ray diffraction pattern which comprises peaks at substantially the same positions as tungsten oxide.

6. The electrode composition according to claim 1, wherein the polymeric binder material is polyvinylidene fluoride or TEFLON powder.

7. The electrode composition according to claim 1, further comprising a conductive carbon material.

8. An electrochemical cell, comprising:
an anode, a cathode and an electrolyte providing a conducting medium between said anode and said cathode, wherein said anode or said cathode comprises an electrode composition comprising a polymeric binder material and a doped tungsten (IV) oxide active material, the active material comprising a tungsten (IV) oxide host material and a metal dopant in the host material effective to increase the charge-discharge capacity per unit weight of the active material.

9. The electrochemical cell according to claim 8, wherein the metal dopant is a metal selected from the group consisting of aluminum, manganese, barium, cobalt, molybdenum, tin, titanium, yttrium, zirconium and combinations thereof.

10. The electrochemical cell according to claim 9, wherein the metal dopant is aluminum or manganese.

11. The electrochemical cell according to claim 8, wherein the active material is of general formula $A_xW_{1-x}O_2$, wherein A is a metal, and x is a number from 0.05 to 0.15.

12. The electrochemical cell according to claim 8, wherein the active material has an X-ray diffraction pattern which comprises peaks at substantially the same positions as tungsten oxide.

13. The electrochemical cell according to claim 8, wherein the polymeric binder material is polyvinylidene fluoride or TEFLON powder.

14. The electrochemical cell according to claim 8, wherein the electrode composition further comprises a conductive carbon material.

15. The electrochemical cell according to claim 8, wherein the cell comprises a plurality of anodes and a plurality of cathodes.

16. The electrochemical cell according to claim 8, further comprising a separator interposed between the anode and cathode.

17. The electrochemical cell according to claim 8, wherein the electrolyte comprises $LiPF_6$ in ethylene carbonate and diethylcarbonate, or $LiPF_6$ in ethylene carbonate and dimethylcarbonate.

18. A mobile telephone comprising the electrochemical cell according to claim 8.

19. An electrically powered vehicle comprising the electrochemical cell according to claim 8.

20. A medical device comprising the electrochemical cell according to claim 8.

21. A security system comprising the electrochemical cell according to claim 8.

* * * * *

UNITED STATES PATENT AND TRADEMARK OFFICE
CERTIFICATE OF CORRECTION

PATENT NO. : 6,291,100 B1  Page 1 of 1
DATED : September 18, 2001
INVENTOR(S) : Doddapaneni et al.

It is certified that error appears in the above-identified patent and that said Letters Patent is hereby corrected as shown below:

<u>Title page,</u>
Item [73], Assignee, please delete "IRMA America, Inc." and replace with -- IMRA America, Inc. --

Signed and Sealed this

Thirtieth Day of April, 2002

Attest:

Attesting Officer

JAMES E. ROGAN
*Director of the United States Patent and Trademark Office*